United States Patent
San Giacomo, Jr. et al.

(10) Patent No.: US 12,545,379 B2
(45) Date of Patent: Feb. 10, 2026

(54) BOAT LIFT LOCKING APPARATUS

(71) Applicants: John Thomas San Giacomo, Jr., Blairstown, NJ (US); Keith Edward Lindemann, Punta Gorda, FL (US)

(72) Inventors: John Thomas San Giacomo, Jr., Blairstown, NJ (US); Keith Edward Lindemann, Punta Gorda, FL (US)

( * ) Notice: Subject to any disclaimer, the term of this patent is extended or adjusted under 35 U.S.C. 154(b) by 329 days.

(21) Appl. No.: 18/210,390

(22) Filed: Jun. 15, 2023

(65) Prior Publication Data

US 2024/0417045 A1 Dec. 19, 2024

(51) Int. Cl.
*E02B 3/24* (2006.01)
*B63C 3/06* (2006.01)

(52) U.S. Cl.
CPC ........................................ *B63C 3/06* (2013.01)

(58) Field of Classification Search
CPC .... B63C 3/06; B63C 5/02; E02B 3/24; B63B 21/00; B63B 2021/001; B66F 3/36
See application file for complete search history.

(56) References Cited

U.S. PATENT DOCUMENTS

| | | | | |
|---|---|---|---|---|
| 3,108,563 A | * | 10/1963 | Wurdack | E02B 3/24 114/230.19 |
| 3,565,271 A | * | 2/1971 | Deck | B60P 3/1008 414/678 |
| 3,603,638 A | * | 9/1971 | McGregor | B64D 11/0619 297/216.2 |
| 3,638,535 A | * | 2/1972 | Ponter | F15B 11/22 91/522 |
| 3,672,525 A | * | 6/1972 | Schaedler | B66F 9/06 414/629 |
| 3,744,757 A | * | 7/1973 | White | B66F 13/00 254/94 |
| 3,749,361 A | * | 7/1973 | Johnson | B60P 1/00 254/8 R |
| 3,755,838 A | * | 9/1973 | Dunagan | B63C 13/00 114/344 |
| 3,772,806 A | * | 11/1973 | Meadows | A01K 80/00 37/316 |
| 3,789,998 A | * | 2/1974 | Fathauer | B66C 1/101 294/81.4 |

(Continued)

FOREIGN PATENT DOCUMENTS

WO WO 2022261024 A1 12/2022

OTHER PUBLICATIONS

Tracy Radcliff, Hurricane Boat Lifts, pp. 1-21; https://www.hurricaneboatlifts.com.

*Primary Examiner* — Edwin J Toledo-Duran
(74) *Attorney, Agent, or Firm* — Ernest D. Buff & Associates, LLC; Ernest D. Buff (57) ABSTRACT

A piling-mounted boat lift locking and strengthening apparatus couples a row of pilings and a lowering/raising platform to form a rigid uni-structure. The apparatus includes a piling mounting bracket assembly (101), a turnbuckle (100) and a positioning indicator assembly (103). It provides the piling-mounted boat lift with an omni-structure that changes the inherent frequency of the assembly. The turnbuckle is designed to mitigate lateral or non-axial loads. An associated bracket assembly enables the apparatus to support the weight of the lift platform. The boat lift exhibits increased rigidity and virtually eliminates angular motion.

16 Claims, 10 Drawing Sheets

(56) References Cited

U.S. PATENT DOCUMENTS

| | | | | |
|---|---|---|---|---|
| 3,800,733 A * | 4/1974 | West | B63B 21/58 | 24/527 |
| 3,806,971 A * | 4/1974 | Elling | B63B 5/24 | 114/357 |
| 3,860,267 A * | 1/1975 | Lyons | B60D 1/40 | 280/479.3 |
| 3,865,347 A * | 2/1975 | Pase | B66F 7/0641 | 254/124 |
| 3,891,173 A * | 6/1975 | Ellis | B63B 45/06 | 248/231.71 |
| 3,951,278 A * | 4/1976 | Pase | B66F 7/08 | 74/105 |
| 4,162,873 A * | 7/1979 | Smith, Jr. | B66F 7/0675 | 182/69.5 |
| 4,262,922 A * | 4/1981 | Nelson | B62D 53/0871 | 280/414.1 |
| 4,325,666 A * | 4/1982 | Chain | A01D 87/127 | 414/785 |
| 4,476,798 A * | 10/1984 | Backus | B63B 3/08 | 114/77 R |
| 4,480,578 A * | 11/1984 | Fisher | B63C 13/00 | 114/344 |
| 4,482,268 A * | 11/1984 | Stevenson | B63C 3/06 | 405/1 |
| 4,571,984 A * | 2/1986 | Malcosky | G01S 15/8902 | 73/19.03 |
| 4,586,452 A * | 5/1986 | Lapetina | B63B 21/66 | 114/245 |
| 4,607,716 A * | 8/1986 | Beck | A01B 69/004 | 172/6 |
| 4,635,805 A * | 1/1987 | Mentzer | B66C 23/708 | 212/230 |
| 4,658,750 A * | 4/1987 | Malcosky | G01N 29/032 | 114/244 |
| 4,694,773 A * | 9/1987 | Sparkes | H01Q 1/34 | 343/709 |
| 4,712,653 A * | 12/1987 | Franklin | B66F 7/08 | 187/269 |
| 4,722,706 A * | 2/1988 | Young | B63B 29/04 | 440/7 |
| 4,810,161 A * | 3/1989 | Dady, Sr. | B66F 9/122 | 414/733 |
| 4,823,910 A * | 4/1989 | Day | E06C 5/02 | 182/84 |
| 4,826,023 A * | 5/1989 | Ortemond | B66C 23/60 | 212/262 |
| 4,890,692 A * | 1/1990 | Oakman | B66F 3/22 | 187/269 |
| 4,890,811 A * | 1/1990 | Ehni | B63H 20/06 | 248/641 |
| 4,964,823 A * | 10/1990 | Newman | B63H 20/22 | 440/61 R |
| 4,998,497 A | 3/1991 | Nelson et al. | | |
| 5,006,083 A * | 4/1991 | Sumigawa | B63H 20/10 | 440/61 R |
| 5,035,336 A * | 7/1991 | Schmitz | B66F 19/005 | 212/343 |
| 5,036,952 A * | 8/1991 | Harper | B66F 9/147 | 187/229 |
| 5,086,724 A * | 2/1992 | Schreiber | B63B 21/46 | 114/301 |
| 5,095,842 A * | 3/1992 | Soules | B63B 21/243 | 114/299 |
| 5,127,859 A * | 7/1992 | Rantilla | B63H 16/107 | D12/302 |
| 5,143,180 A * | 9/1992 | Harper | B66F 9/10 | 187/229 |
| 5,156,238 A * | 10/1992 | Matthews | B66F 7/0625 | 254/89 R |
| 5,165,706 A * | 11/1992 | Fond | B60P 3/1075 | 280/414.1 |
| 5,232,203 A * | 8/1993 | Butts | B66F 15/00 | 254/8 R |
| 5,292,145 A * | 3/1994 | Ostrand | B60P 3/1066 | 280/475 |
| 5,312,121 A * | 5/1994 | Chapman | B66F 11/048 | 280/47.11 |
| 5,340,082 A * | 8/1994 | Holloway | B66F 7/0641 | 254/90 |
| 5,372,001 A * | 12/1994 | Olson | A01D 44/00 | 56/8 |
| 5,493,991 A | 2/1996 | Wright et al. | | |
| 5,580,208 A * | 12/1996 | Miller, Sr. | B66F 9/19 | 414/920 |
| 5,690,042 A * | 11/1997 | Bentley | B63B 21/00 | 410/116 |
| 5,788,417 A * | 8/1998 | Fontenot | E02B 17/027 | 166/368 |
| 5,913,385 A * | 6/1999 | Thibodeau | F16D 66/02 | 116/281 |
| 5,915,322 A * | 6/1999 | Adams | B63H 25/30 | 114/144 C |
| 5,931,710 A * | 8/1999 | Johnson, Sr. | B63H 5/125 | 440/62 |
| 5,937,781 A * | 8/1999 | Isella | E02B 3/26 | 114/230.26 |
| 5,979,606 A * | 11/1999 | Wheeler | B66F 7/065 | 187/269 |
| 6,009,826 A * | 1/2000 | Nole | B63B 21/46 | 114/299 |
| 6,029,596 A * | 2/2000 | Hoofman | B63B 21/00 | 114/230.1 |
| 6,053,122 A * | 4/2000 | Jordan, III | A01K 91/08 | 43/21.2 |
| 6,068,310 A * | 5/2000 | Fuller | B66C 1/66 | 294/215 |
| 6,135,481 A * | 10/2000 | Bishop, III | B60P 3/10 | 414/529 |
| 6,202,868 B1 * | 3/2001 | Murray | B60P 1/5495 | 452/187 |
| 6,216,625 B1 * | 4/2001 | Baluha | B63B 21/00 | 114/230.27 |
| 6,224,436 B1 * | 5/2001 | Westhoff | B63H 11/11 | 440/41 |
| 6,227,569 B1 * | 5/2001 | Dingeldein | B60S 9/10 | 280/764.1 |
| 6,244,914 B1 * | 6/2001 | Freitag | B63H 11/11 | 440/82 |
| 6,286,852 B1 * | 9/2001 | Slatten | B60D 1/145 | 280/479.3 |
| 6,328,326 B1 * | 12/2001 | Slatten | B60D 1/52 | 280/479.3 |
| 6,364,060 B1 * | 4/2002 | Cherry | B66F 7/08 | 187/203 |
| 6,561,113 B2 * | 5/2003 | Leise | B63B 21/00 | 114/221 R |
| 6,746,181 B1 * | 6/2004 | Heintz | E02B 3/068 | 114/263 |
| 6,799,529 B1 * | 10/2004 | Willis | B63B 17/02 | 114/361 |
| 6,851,380 B1 * | 2/2005 | Khoury | B63B 21/56 | 114/230.15 |
| 6,923,136 B1 * | 8/2005 | D'Alessandro | B63H 20/10 | 114/285 |
| 6,962,122 B1 | 11/2005 | Bouldin, Jr. | | |
| 7,013,823 B1 * | 3/2006 | Daugherty | B63B 45/00 | 114/252 |
| 7,155,987 B1 * | 1/2007 | Tumlin | G01M 5/005 | 73/862.393 |
| 7,234,408 B1 * | 6/2007 | Clemmons | B63B 34/67 | 114/364 |
| 7,293,791 B1 * | 11/2007 | Williams, Jr. | B60D 1/00 | 280/479.2 |
| 7,314,015 B1 | 1/2008 | Obahi et al. | | |
| 7,584,984 B1 * | 9/2009 | Williams, Jr. | B60D 1/565 | 280/479.2 |

(56) References Cited

U.S. PATENT DOCUMENTS

| | | | | |
|---|---|---|---|---|
| 7,850,192 B2* | 12/2010 | Ceccarelli | | B60D 1/40 |
| | | | | 280/491.5 |
| 8,424,643 B1* | 4/2013 | Speaks | | B63B 17/00 |
| | | | | 182/91 |
| 8,474,852 B1* | 7/2013 | Granados | | B60D 1/36 |
| | | | | 280/479.2 |
| 8,490,923 B2 | 7/2013 | Bosqueiro | | B66C 5/02 |
| | | | | 212/181 |
| 8,926,217 B1* | 1/2015 | Smith | | B63C 3/12 |
| | | | | 248/176.1 |
| 9,382,657 B1* | 7/2016 | Brooke | | D06F 89/00 |
| 11,447,044 B1* | 9/2022 | Boks | | B60N 2/02246 |
| 12,006,010 B1* | 6/2024 | Gibbons | | B66F 3/36 |
| 2002/0003342 A1 | 1/2002 | Slatten | | B60D 1/40 |
| | | | | 280/479.3 |
| 2002/0040672 A1* | 4/2002 | Booth | | E02B 3/20 |
| | | | | 114/230.1 |
| 2002/0131821 A1* | 9/2002 | Elson | | B63C 1/04 |
| | | | | 405/3 |
| 2003/0049100 A1* | 3/2003 | Coblentz | | B66C 1/62 |
| | | | | 414/803 |
| 2005/0175414 A1* | 8/2005 | Abbott | | B63B 35/4413 |
| | | | | 405/203 |
| 2006/0019555 A1* | 1/2006 | McGuinness | | B63H 16/20 |
| | | | | 440/21 |
| 2007/0010144 A1* | 1/2007 | Arneson | | B63H 1/14 |
| | | | | 440/66 |
| 2007/0034768 A1* | 2/2007 | Stenard | | B60N 2/42736 |
| | | | | 248/562 |
| 2008/0000412 A1* | 1/2008 | Mazzei | | G09F 17/00 |
| | | | | 116/303 |
| 2008/0105190 A1* | 5/2008 | Garelick | | B63B 27/146 |
| | | | | 114/362 |
| 2009/0202300 A1* | 8/2009 | Basta | | B63C 3/06 |
| | | | | 405/3 |
| 2010/0108445 A1* | 5/2010 | Kritzer | | B66F 3/46 |
| | | | | 187/218 |
| 2011/0146554 A1* | 6/2011 | Wright | | B63B 35/613 |
| | | | | 114/45 |
| 2012/0048653 A1* | 3/2012 | Matthews | | B66F 7/08 |
| | | | | 187/211 |
| 2012/0125253 A1* | 5/2012 | Hauersperger | | B63B 23/06 |
| | | | | 114/268 |
| 2013/0233651 A1* | 9/2013 | Kritzer | | B66F 3/46 |
| | | | | 187/208 |
| 2013/0309044 A1* | 11/2013 | Adams | | E21B 19/15 |
| | | | | 414/22.51 |
| 2013/0309053 A1* | 11/2013 | Cameron | | B60P 3/1025 |
| | | | | 414/537 |
| 2014/0299045 A1* | 10/2014 | Mette | | E05B 85/08 |
| | | | | 116/279 |
| 2015/0041741 A1* | 2/2015 | Hyslop | | B60S 9/04 |
| | | | | 254/422 |
| 2015/0321729 A1* | 11/2015 | Poppell | | B63B 17/04 |
| | | | | 114/364 |
| 2017/0122042 A1* | 5/2017 | Travis | | E21B 33/0415 |
| 2018/0118538 A1* | 5/2018 | Latvys | | B66F 7/08 |
| 2019/0016428 A1* | 1/2019 | McCall | | B63H 16/06 |
| 2020/0377352 A1* | 12/2020 | Dieringer | | B66F 9/10 |
| 2021/0016861 A1* | 1/2021 | Peterson | | E02C 3/00 |
| 2021/0139109 A1* | 5/2021 | Liu | | B63B 27/24 |
| 2021/0331904 A1* | 10/2021 | Kritzer | | B66F 7/28 |
| 2022/0017342 A1* | 1/2022 | Kritzer | | B66F 7/04 |
| 2022/0154683 A1* | 5/2022 | Mummery | | F03B 17/06 |
| 2022/0227614 A1* | 7/2022 | Yutzy | | B66F 11/046 |
| 2022/0234690 A1* | 7/2022 | Logan | | B63B 21/20 |
| 2022/0396461 A1* | 12/2022 | Irving | | B66F 15/00 |
| 2023/0264937 A1* | 8/2023 | Hoover | | B66F 17/006 |
| | | | | 182/2.3 |
| 2023/0294965 A1* | 9/2023 | Kritzer | | B66F 7/20 |
| | | | | 187/216 |
| 2024/0367956 A1* | 11/2024 | Kritzer | | B66F 7/28 |

* cited by examiner

BOAT LIFT LOCKING APPARATUS

BACKGROUND

1. Field of the Invention

The invention generally relates to piling-mounted boat lifts and more particularly relates to a locking apparatus that efficiently secures a lift platform and its contents in the event of partial failure of the lift components during a heavy storm or a tidal surge.

2. Description of the Prior Art

A piling-mounted boat lift is a device mostly used for boat storage. It is raised to a storage position to keep the boat supported on it out of the water when not in use. When the boat is to be launched, the boat lift lowers the boat into the water. Piling-mounted boat lifts are commonly used on private docks at residential homes that have water access and marinas that rent dock space. A typical piling-mounted boat lift has a lifting platform or cradle, which supports the boat, and a system of cables, for example, four corner-mounted, fixed, winch-driven cables, which raise and lower the platform. The boat lifts are operated by electric motors mounted in the winches and controlled manually through a control panel mounted dockside.

Conventional piling-mounted boat lifts kinetically form a pendulum that is subject to a swaying movement and, consequently, are vulnerable to the effects of high winds and tidal surges, thus making the boat lift susceptible to damage or failure during a severe weather event.

There accordingly exists a need in the art for a boat lift securing apparatus that not only prevents boat lift swaying due to winds but also supports and strengthens the entire structure during harsh weather conditions.

SUMMARY

This section provides a general summary of the disclosure and is not a comprehensive disclosure of the full scope of all its features.

The present invention provides a piling-mounted boat lift securing apparatus (hereinafter referred to as the apparatus) that safely and securely engages a lift platform and its contents to a load such as a boat in all weather conditions. The apparatus as disclosed has a locking and strengthening mechanism, which prevents the boat from being ejected from its moorings during a tidal surge. The apparatus also secures and locks cable winch boat lifts during windy and harsh weather.

In an embodiment, the apparatus includes a piling mounting bracket assembly, a turnbuckle, a lift beam bracket assembly, and a positioning indicator assembly. The piling mounting bracket assembly comprises a bracket plate and a clevis, wherein the piling mounting bracket assembly is configured to attach to a piling. The turnbuckle comprises a first end and a second end, wherein the first end of the turnbuckle is pivoted to the clevis of the piling mounting bracket assembly, and wherein the second end of the turnbuckle is configured to attach to the clevis formed by the lift beam bracket assembly, mounted with the lowering/raising platform. The positioning indicator assembly comprises a lift indicator mounted into the clevis of the piling mounting bracket assembly, and an activator bracket mounted on the first end of the turnbuckle, wherein when the turnbuckle is deployed by manually rotating in a downward direction along the pivot point, the activator bracket engages with the lift indicator and forces the lift indicator to raise from a normal resting position against a top surface of the clevis of the piling mounting bracket assembly, thereby creating a visual gap indicating a safe and correct height of the lowering/raising platform to an operator for attachment of the turnbuckle with a lowering/raising platform.

In an embodiment, the bracket plate comprises a plurality of through holes, adapted to receive therein a plurality of fasteners for securing the piling mounting bracket assembly to the piling.

In an embodiment, the turnbuckle is pivoted to the clevis of the piling mounting bracket assembly through a permanent locked screw, washers, and lock nut, which passes through a pivot hole in the first end of the turnbuckle.

In an embodiment, the apparatus comprises a lift beam bracket assembly mounted on the lowering/raising platform, wherein the lift beam bracket assembly comprises a clevis attachment point configured to receive therein the second end of the turnbuckle.

In an embodiment, a locking pin secures the clevis attachment point and the second end of the turnbuckle, wherein the locking pin comprises a through-hole perpendicular to its shaft diameter adapted to accept at least one of a padlock and a like locking device.

In an embodiment, the apparatus comprises a locking snap attached onto the piling at a distance from the piling mounting bracket assembly for detachably snap-fitting the turnbuckle.

In another embodiment, the apparatus comprises a strap attachment bracket assembly and a securing strap for connecting together the contents of the lift (the boat) and lowering/raising platform.

In another embodiment, the apparatus comprises a plurality of padlocks or pin locks for securing the apparatus to the piling to prevent theft.

In another embodiment, the apparatus comprises a safety link that secures the lowering/raising platform to the piling in the event of partial failure of the lift components.

In another embodiment, the apparatus is configured to fit a multitude of sizes and designs of standard commercially available piling-mounted boat lifts.

In another embodiment, the apparatus includes an adjustment mechanism for eliminating the swaying movement inherent in piling-mounted boat lifts.

In another embodiment, the apparatus includes a locking mechanism associated with said adjustment mechanism so that upon being adjusted, said apparatus can be locked to remain in a rigid configuration.

In another embodiment, the turnbuckles are designed to handle increased non-axial loads.

In another embodiment, the apparatus is hand deployed with no extra components or tools.

In another embodiment, the apparatus is permanently mounted for rapid deployment.

In another embodiment, the apparatus is operative to lock the piling-mounted boat lift for security and theft prevention.

The apparatus of the present invention has a uni-structural assembly, which is more rigid and changes the inherent frequency of the assembly, thereby eliminating any angular movement, such as pendulum motion.

Advantageously, the apparatus, as disclosed, can support the lift platform in case of failure of supporting cables. Further, the turnbuckle of the apparatus is designed to facilitate the handling of the increased effects of lateral or non-axial loads. Moreover, the bracket assembly as disclosed enables the apparatus to support the weight of the lift platform in an effective manner.

The apparatus, as disclosed herein, can be used as a security device to prevent theft, whereby the turnbuckle and its attachment points may be locked by means of padlocks or pin locks if desired by the operator.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The invention will be more fully understood, and further advantages will become apparent when reference is had to the following detailed description and the accompanying drawings that set forth illustrative embodiments in which the principles of the invention are utilized, and in which.

DETAILED DESCRIPTION

The embodiments herein and the various features and advantageous details thereof are explained more fully with reference to the non-limiting embodiments that are illustrated in the accompanying drawings and the following description. Numerous variations, changes, and substitutions may occur to those skilled in the art without departing from the invention, as defined by the subjoined claims. It should be understood that various alternatives to the embodiments of the present disclosure herein may be employed and that the description should be interpreted as illustrative and not in a limiting sense.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

Figure 1:
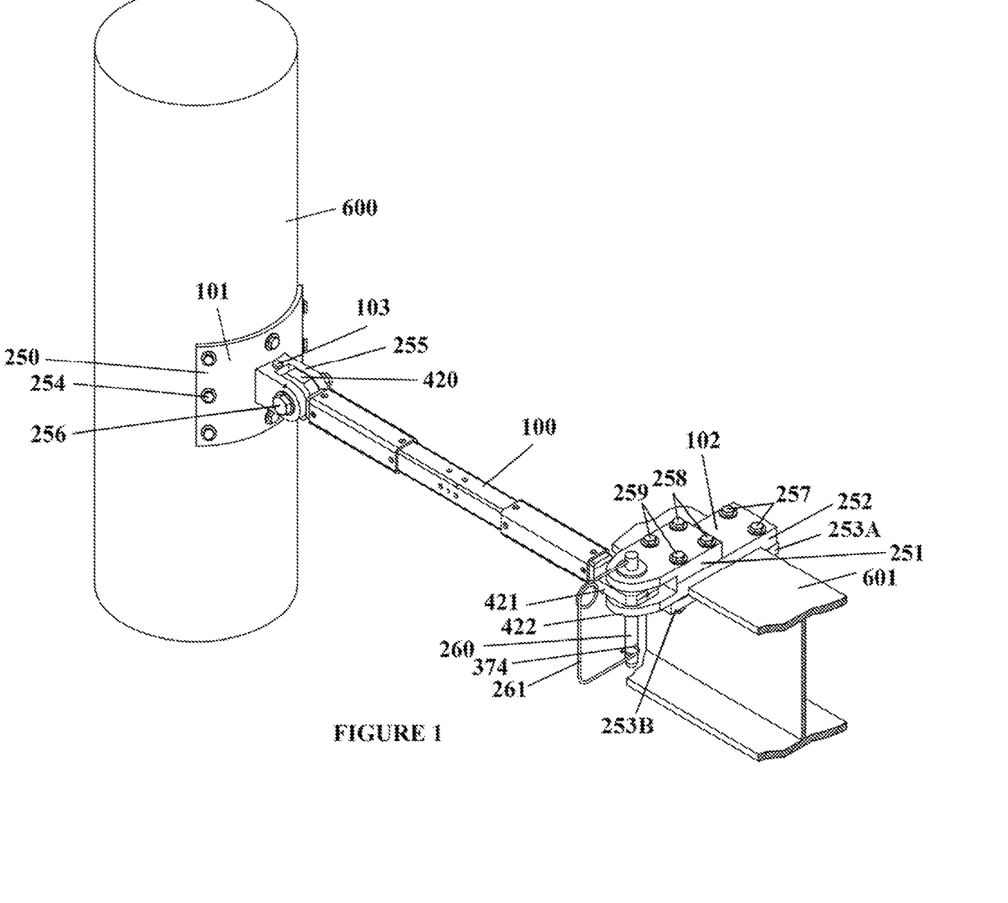
FIG. 1 illustrates a sectional perspective view of a piling-mounted boat lift locking apparatus in accordance with the present invention.

According to various embodiments of the present invention, a piling-mounted boat lift locking apparatus is described hereafter. With reference to FIG. 1, there is shown a sectional perspective view of the piling-mounted boat lift locking apparatus, hereinafter referred to as the "apparatus." Generally stated, the apparatus comprises a piling mounting bracket assembly 101 configured to be attached to a piling 600. The piling mounting bracket assembly 101, in an embodiment, comprises a bracket plate 250 and a clevis 255 permanently fixed together. The bracket plate 250 comprises a plurality of through holes adapted to receive therein a plurality of fasteners 254. As shown in the figure, the piling mounting bracket assembly 101 is securely attached onto the piling 600 using fasteners 254.

The apparatus further comprises a lift beam bracket assembly 102 mounted on a beam of the lowering/raising platform 601. The lift beam bracket assembly 102 comprises a head plate 251, a top plate 252, and two base plates 253A and 253B, attached together to form the lift beam bracket assembly 102. The top plate 252 and two base plates 253A and 253B clamp onto the beam of the lowering/raising platform 601 using fasteners 257. The head plate 251 is fastened over the top plate 252 using fasteners 258, 259, forming a clevis attachment point 422.

Further, the apparatus includes a turnbuckle 100 for coupling the pilings 600 and lowering/raising platform 601, forming a uni-structural assembly. The turnbuckle 100 comprises a first end 420 and a second end 421. The first end 420 of the turnbuckle 100 is pivoted to the clevis 255 of the piling mounting bracket assembly 101 using a permanent locked screw 256. The second end 421 of the turnbuckle 100 is configured to attach with a lowering/raising platform 601 of the apparatus, wherein the clevis attachment point 422 is configured to receive therein the second end 421 of the turnbuckle 100. Hence, the piling mounting bracket assembly 101 mounted on the pilings 600 executes a primary function of linking the piling 600 to the first end 420 of the turnbuckle 100.

As shown in the figure, a locking pin 260 secures the second end 421 of the turnbuckle 100 inside the clevis attachment point 422. The locking pin 260 comprises a hole 374 perpendicular to its shaft diameter adapted to accept at least one of a padlock and a like locking device to prevent theft of the boat during long-term storage. The locking pin 260 further includes a locking clip 261, which clasps around the locking pin 260.

The apparatus further comprises a positioning indicator assembly 103 comprising a lift indicator 263 mounted into the clevis 255 of the piling mounting bracket assembly 101, and an activator bracket 264 (shown in FIGS. 3-7) is mounted on the first end 420 of the turnbuckle 100. Once the turnbuckle 100 is deployed by manually rotating in a downward direction along the pivot point (attachment operation will be explained in detail in the description of FIG. 3 to FIG. 7), the activator bracket 264 engages with the lift indicator 263 and forces the lift indicator 263 to raise from a normal resting position against a top surface of the clevis 255 of the piling mounting bracket assembly 101. This creates a visual gap indicating a safe and correct height of the lowering/raising platform 601 to an operator for attachment of the second end 421 of the turnbuckle 100 with the lowering/raising platform 601.

In an embodiment, the apparatus also comprises a strap attachment bracket assembly 104 and a securing strap 708 (not shown in the figure, but shown in FIGS. 8-10 as 104 and 708) for connecting together the lowering/raising platform 601,706, 704, and the contents of the boat lift.

Figure 2:
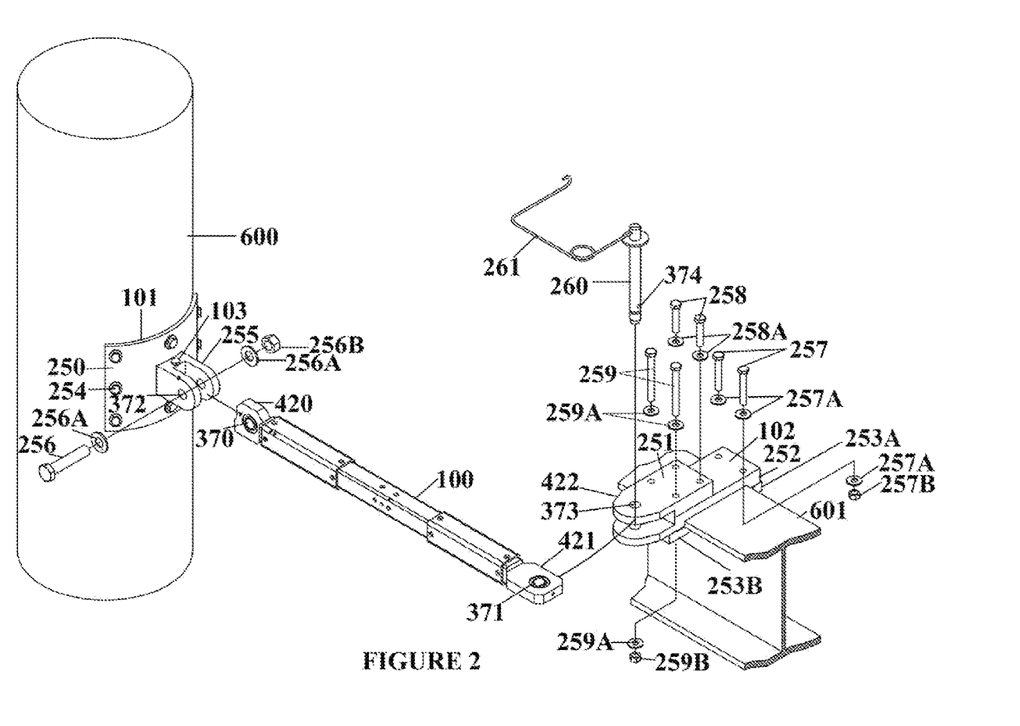
FIG. 2 illustrates an exploded view of the piling-mounted boat lift locking apparatus of FIG. 1.

FIG. 2 illustrates an exploded view of the apparatus, in accordance with the present invention. All the components disclosed in FIG. 1 are shown here in greater detail. As can be seen in the figure, the first end 420 of the turnbuckle 100 includes a pivot hole 370, which pivots the turnbuckle 100 to the clevis 255 of the piling mounting bracket assembly 101 using a permanently locked screw 256. Also, washers 256a are inserted into the permanent locked screw 256 on either side of the clevis 255 and the permanent locked screw 256 is inserted into the clevis 255 connecting the first end 420 of the turnbuckle 100, and a lock nut 256b is fastened on the permanently locked screw 256. Here, adding washers 256a prevents the permanent locked screw 256 from loosening and also distributes the load from the head of the permanent locked screw 256 and the lock nut 256b over a larger area.

Further, as shown in FIG. 2, one or more fasteners 257 may be used for clamping the top plate 252 and the base plate 253A uses washers 257a on the outer surfaces of the top plate 252 and the base plate 253A before fastening the lock nut 257b. Similarly, fasteners 259 may be used for clamping the head plate 251 over the top plate 252, and the base plate 253B, using washers 259A on the outer surfaces of the head plate 251 and the top plate 253B before fastening the lock nut 259B respectively. Fastener 258 may be used to clamp head plate 251 over the top plate 252, using a washer 258A on the outer surface of the head plate 251, threading into the top plate 252 mating threaded holes.

As shown here, the clevis attachment point 422 is configured to receive therein the second end 421 of the turnbuckle 100, such that a hole 371 of the second end 421 of the turnbuckle 100 is concentric to a hole 373 of the clevis attachment point 422. The locking pin 260 passes through the second end 421 of the turnbuckle 100 and the clevis attachment point 422 through holes 371, 373 and securely couples the two mechanisms together. The locking clip 261, which clasps around locking pin 260, is shown in a disengaged position in FIG. 2. After securing the turnbuckle 100 with the lift beam bracket assembly 102, locking clip 261 gets engaged to avoid accidental removal of the locking pin 260.

Figure 3:
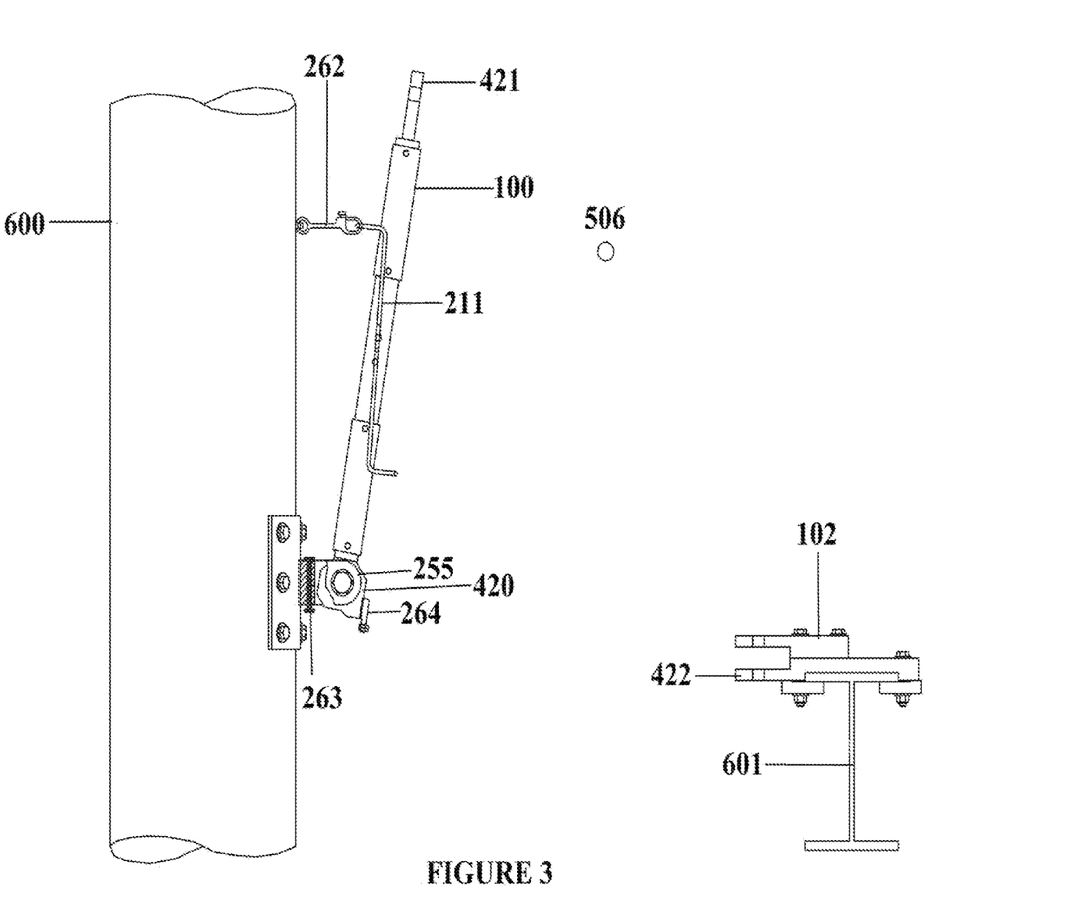
FIG. 3 illustrates a planer view of the piling-mounted boat lift locking apparatus with a turnbuckle in a stored position, in accordance with the present invention.

FIG. 3 illustrates a planer view of the apparatus with the turnbuckle 100 in an upright stored position 506, in accordance with the present invention. As shown, a locking snap 262 is attached to the piling 600 at a distance away from the piling mounting bracket assembly 101. The locking snap 262 is configured for detachably snap-fitting the turnbuckle 100 when it is not in use, i.e., the turnbuckle 100 is kept in the upright stored position 506. In said position, an adjustment handle 211 of the turnbuckle 100 in a rest position lying longitudinal to the turnbuckle 100 is snapped into the locking snap 262. Further, the lift indicator 263 of the positioning indicator assembly 103 is mounted into the clevis 255 of the piling mounting bracket assembly 101, and the activator bracket 264 is mounted on the first end 420 of the turnbuckle 100. In operation, the positioning indicator assembly 103 creates an indication for a safe and correct height of the lowering/raising platform 601 to the operator for attachment of the turnbuckle 100 with the lowering/raising platform 601.

Figures 4, 4A:
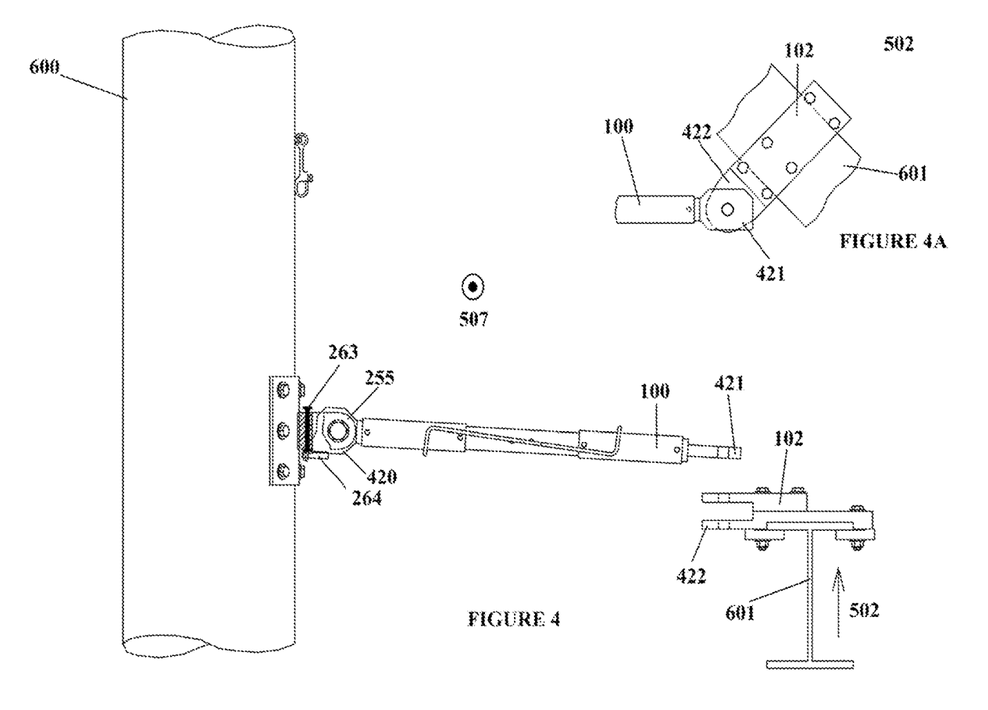
FIG. 4 illustrates a planer view of the piling-mounted boat lift locking apparatus with the turnbuckle in a primed position connected to a lowering/raising platform, in accordance with the present invention.
FIG. 4A illustrates a sectional top view of the turnbuckle and the lowering/raising platform, as shown in FIG. 4.

FIG. 4 illustrates a planer view of the apparatus with the turnbuckle 100 in a primed position 507, in accordance with the present invention. In order to engage the apparatus from the upright stored position 506, the turnbuckle 100 is first unsnapped from the locking snap 262, thereby releasing the turnbuckle 100 from the upright stored position 506, and manually moving the turnbuckle 100 in a downward direction 505 (as shown in FIGS. 3-4) to the primed position 507. As shown in FIG. 4A, a sectional top view of the apparatus of FIG. 4 is illustrated, depicting that the turnbuckle 100 is aligned at a correct primed position 507 when moved in the downward direction 505, i.e., the midpoint of the lateral outward rotation 510 and the lateral inward rotation 511, where the second end 421 of the turnbuckle 100 coincides the clevis attachment point 422. The primed position 506 activates the positioning indicator assembly 103, as can be seen in FIG. 4, where the activator bracket 264 comes in contact with the lift indicator 263, thereby forcing the lift indicator 263 to rise from its normal position against the top surface of the clevis 255 of the piling mounting bracket assembly 101, creating a visual gap between the surfaces. Simultaneously, the lowering/raising platform 601 comprising the lift beam bracket assembly 102 actuated by the operator is raised in an upward direction 502. The lifting of the lowering/raising platform 601 can be actuated using any of the means of the electric-powered winches.

Figures 5, 5A:
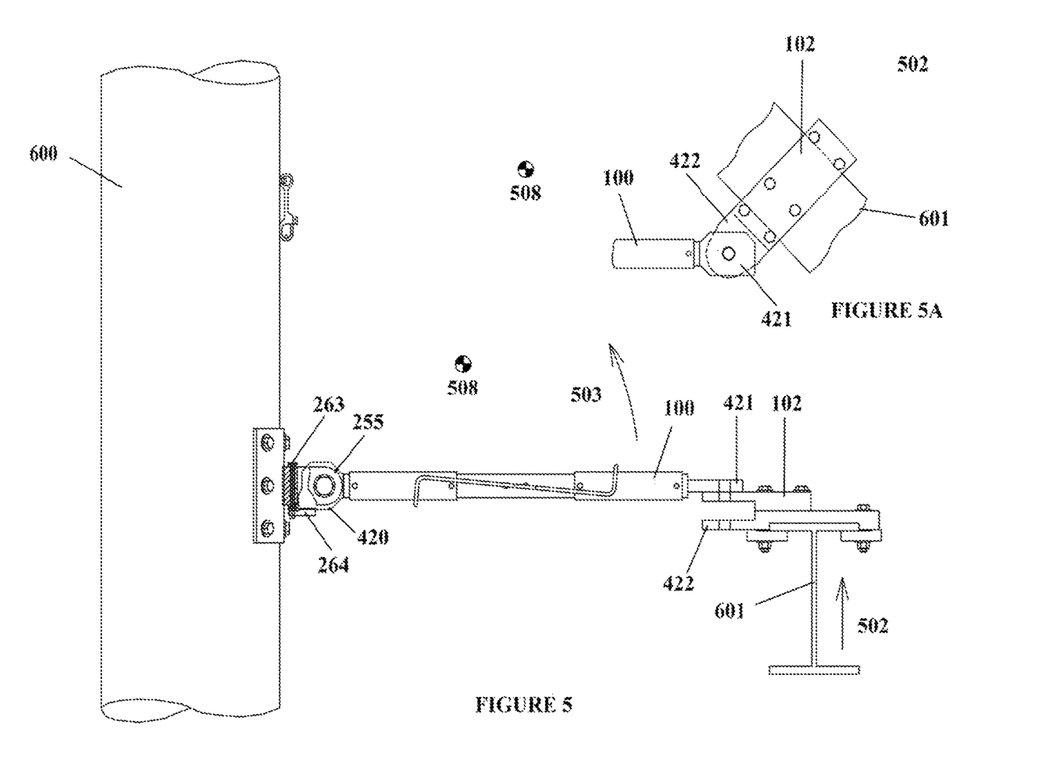
FIG. 5 illustrates a planer view of the piling-mounted boat lift locking apparatus with the turnbuckle in an engagement position with the lowering/raising platform, in accordance with the present invention.
FIG. 5A illustrates a sectional top view of the turnbuckle and the lowering/raising platform as shown in FIG. 5.

FIG. 5 illustrates a planer view of the apparatus with the turnbuckle 100 in an engagement position 508 and the lowering/raising platform 601 raised in an upward direction 502, in accordance with the present invention. As the lowering/raising platform 601 approaches the engagement position 508, the second end 421 of the turnbuckle 100 comes in contact with the lift beam bracket assembly 102, and the turnbuckle 100 begins to start an upward rotation 503 towards the engagement position 508. With the upward rotation 503 of the turnbuckle 100, the lift indicator 263 begins to fall, which decreases the visual gap between the lift indicator 263 and the clevis 255 top surfaces. Further, as shown in FIG. 5A, the turnbuckle 100 still coincides with the clevis attachment point 422, while the lift beam bracket assembly 102 of the lowering/raising platform 601 is being raised in the upward direction 502.

Figures 6, 6A:
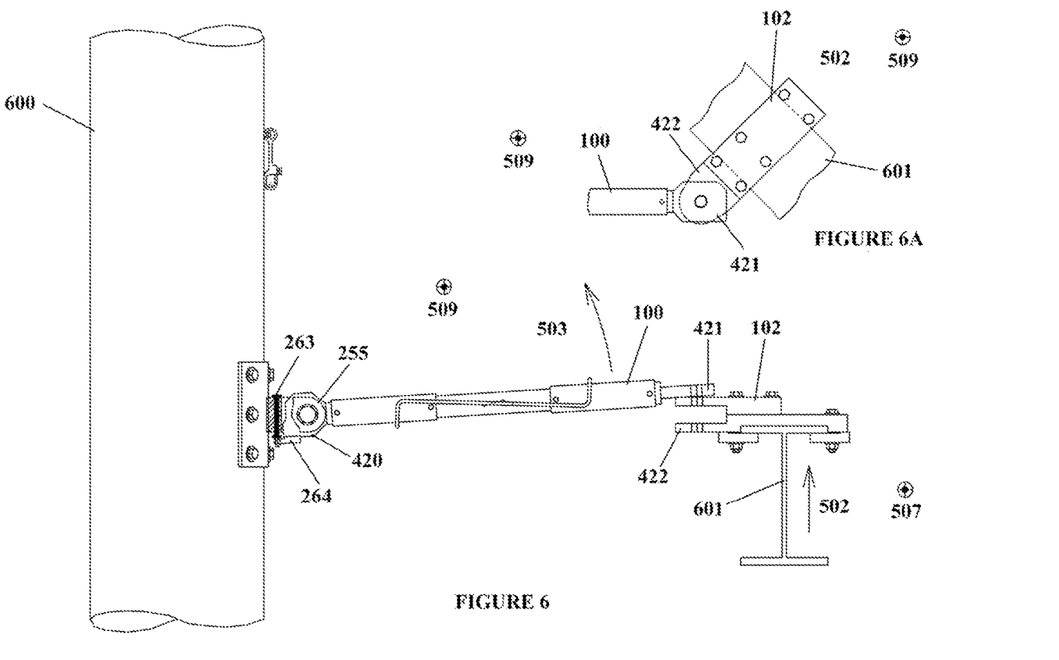
FIG. 6 illustrates a planer view of the piling-mounted boat lift locking apparatus with the turnbuckle and the lowering/raising platform in a target position, in accordance with the present invention.
FIG. 6A illustrates a sectional top view of the turnbuckle and the lowering/raising platform as shown in FIG. 6.

Referring to FIG. 6, a planer view of the apparatus is shown with the turnbuckle 100 in a target position and the lowering/raising platform 601 also in the target position, in accordance with the present invention. The target position 507 is successfully achieved when the lowering/raising platform 601 being raised in the upward direction 502 provides the upward rotation 503 to the turnbuckle 100 such that the gap between the lift indicator 263 and the clevis 255 top surfaces completely closes, and head of the lift indicator 263 rests on the surface of the clevis 255 of the piling mounting bracket assembly 101. As shown in the figure, lift beam bracket assembly 102 of the lowering/raising platform 601 is at the target position 509, where the operator halts any further movement of the lowering/raising platform upward direction 502. As shown in FIG. 6A, a sectional top view of the apparatus of FIG. 6 is illustrated, depicting that the turnbuckle 100 is still coinciding with the clevis attachment point 422, while the lift beam bracket assembly 102 of the lowering/raising platform 601 is raised to the target position 509.

Figures 7, 7A:
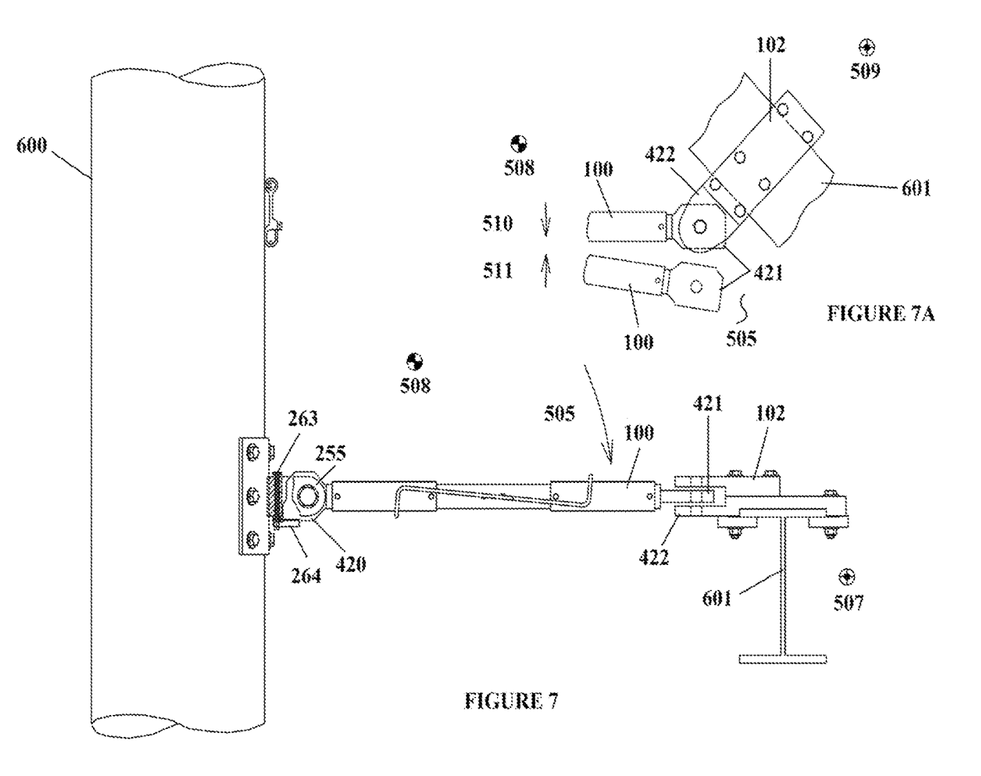
FIG. 7 illustrates a planer view of the piling-mounted boat lift locking apparatus with the turnbuckle in the engagement position and lowering/raising platform in the target position, in accordance with another embodiment of the present invention.
FIG. 7A illustrates a sectional top view of the turnbuckle and the lowering/raising platform, as shown in FIG. 7.

Now referring to FIG. 7, a planer view of the apparatus is shown with the turnbuckle 100 in the engagement position 508 and lowering/raising platform 601 in the target position 507, in accordance with the present invention. Initially, as shown in FIG. 6, the turnbuckle 100 was in the target position 507. Now, in order to engage the second end 421 of the turnbuckle 100 with the lift beam bracket assembly 102 of the lowering/raising platform 601, as shown in FIG. 7A, the second end 421 of the turnbuckle 100 is first manually provided lateral outward rotation 510, thereby freeing the second end 421 of the turnbuckle 100 from contact of the lift beam bracket assembly 102 of the lowering/raising platform 601, and then the operator manually provides the downward rotation 505 to the turnbuckle 100, as shown in FIG. 7. Finally, as shown in FIG. 7A, the second end 421 of the turnbuckle 100 is manually provided lateral inward rotation 511, thereby inserting the second end 421 of the turnbuckle 100 inside the lift beam bracket assembly 102 of the lowering/raising platform 601. This completes the engagement of the turnbuckle 100 with the lift beam bracket assembly 102 of the lowering/raising platform 601, and the turnbuckle 100 ready to be unlocked and set.

Figure 8:
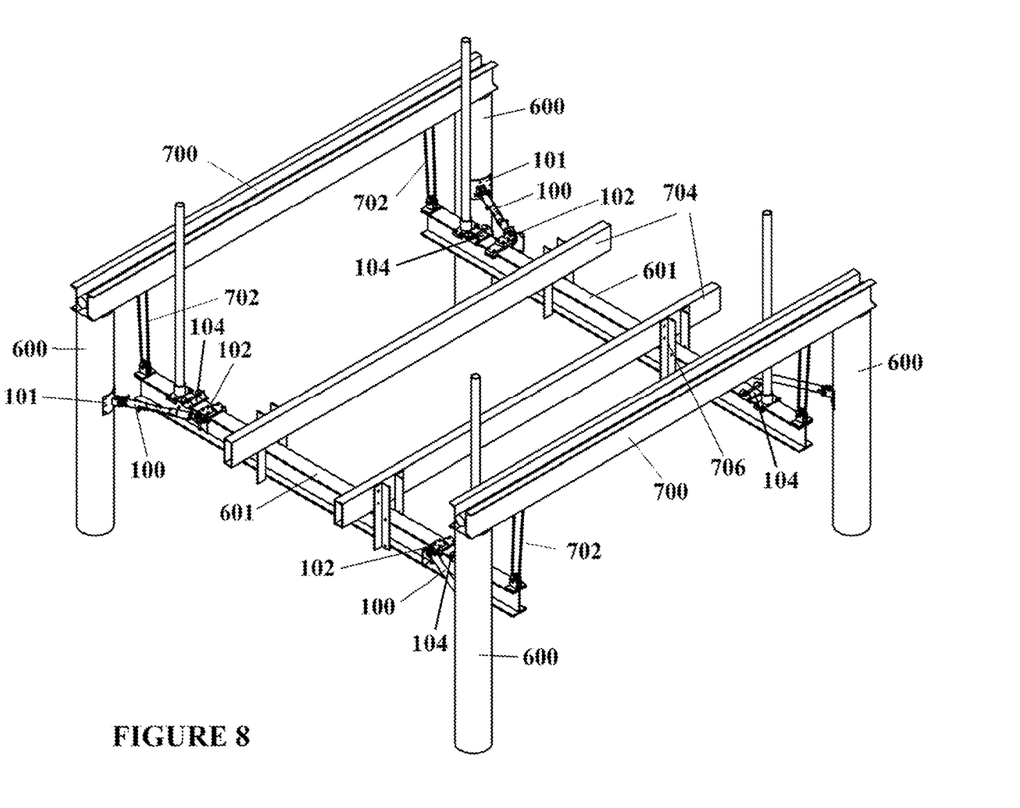
FIG. 8 illustrates a perspective view of a boat lift incorporating therein the piling-mounted boat lift locking apparatus, in accordance with the present invention.

FIG. 8 illustrates a perspective view of the boat lift incorporating therein the piling-mounted boat lift locking apparatuses, wherein the turnbuckle 100 is in an engagement position 508, in accordance with an implementation of the present invention. As shown, one end of each of the piling-mounted boat lift locking apparatuses, four in total, is attached with a respective piling 600 using the piling mounting bracket assembly 101. Further, a pair of pilings 600 at two opposite ends supports a respective piling beam/winch assembly 700 on top. Further, a cable 702 is provided, having one end connected to the piling beam/winch assembly internal winches 700 and another to the lowering/raising platform 601 for lifting the lowering/raising platform 601 to an appropriate height. Further as shown in the figure, a bunk assembly 704 is attached to the lowering/raising platform 601 using bunk brackets 706. The bunk assembly 704 is adapted to support a boat (not shown) to be carried on the lowering/raising platform 601.

Figure 9:
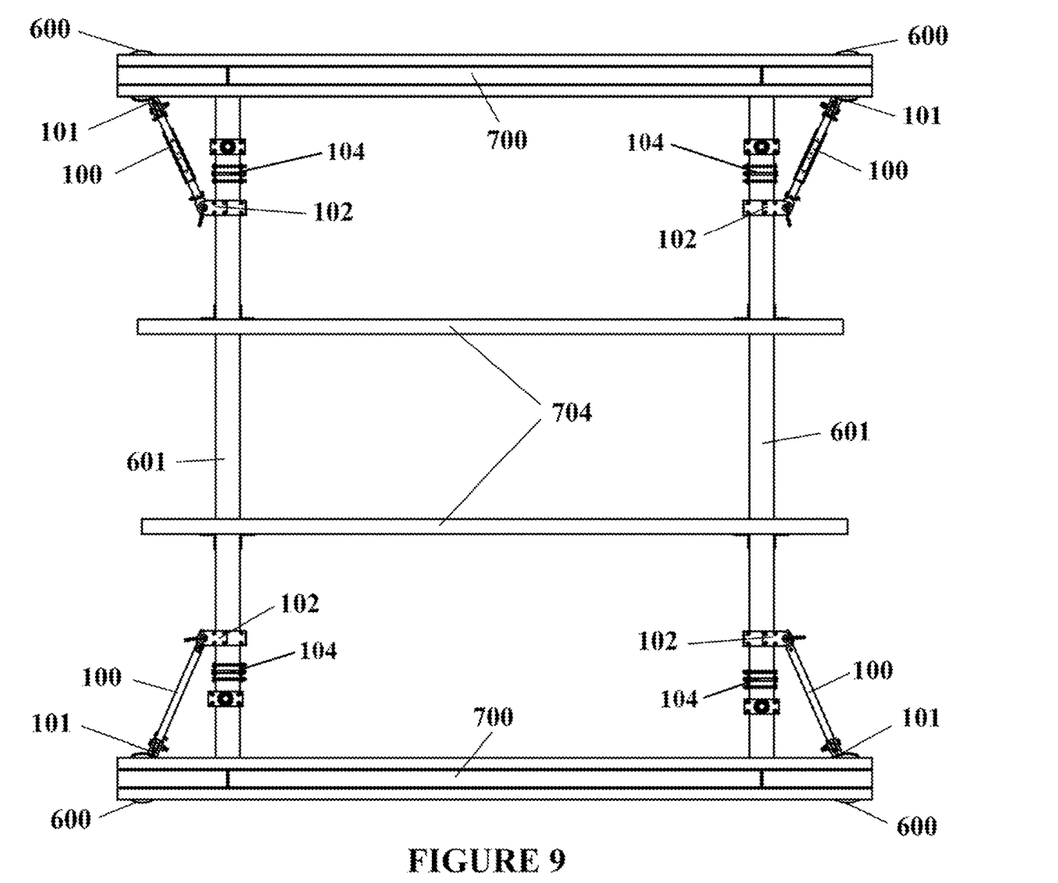
FIG. 9 illustrates a top view of the boat lift incorporating therein the piling-mounted boat lift locking apparatus, in accordance with the present invention.

FIG. 9 illustrates a top view of the boat lift incorporating therein the piling-mounted boat lift locking apparatus in engaged position 508, as shown in FIG. 8. As shown here, the piling-mounted boat lift locking apparatus comprising the piling mounting bracket assembly 101, the turnbuckle 100, and the lift beam bracket assembly 102 is installed on all corners of the boat lift. When installed, the piling-mounted boat lift locking apparatus not only advantageously prevents swaying of the boat lift due to winds but also supports and strengthens the entire structure during harsh weather conditions.

Figure 10:
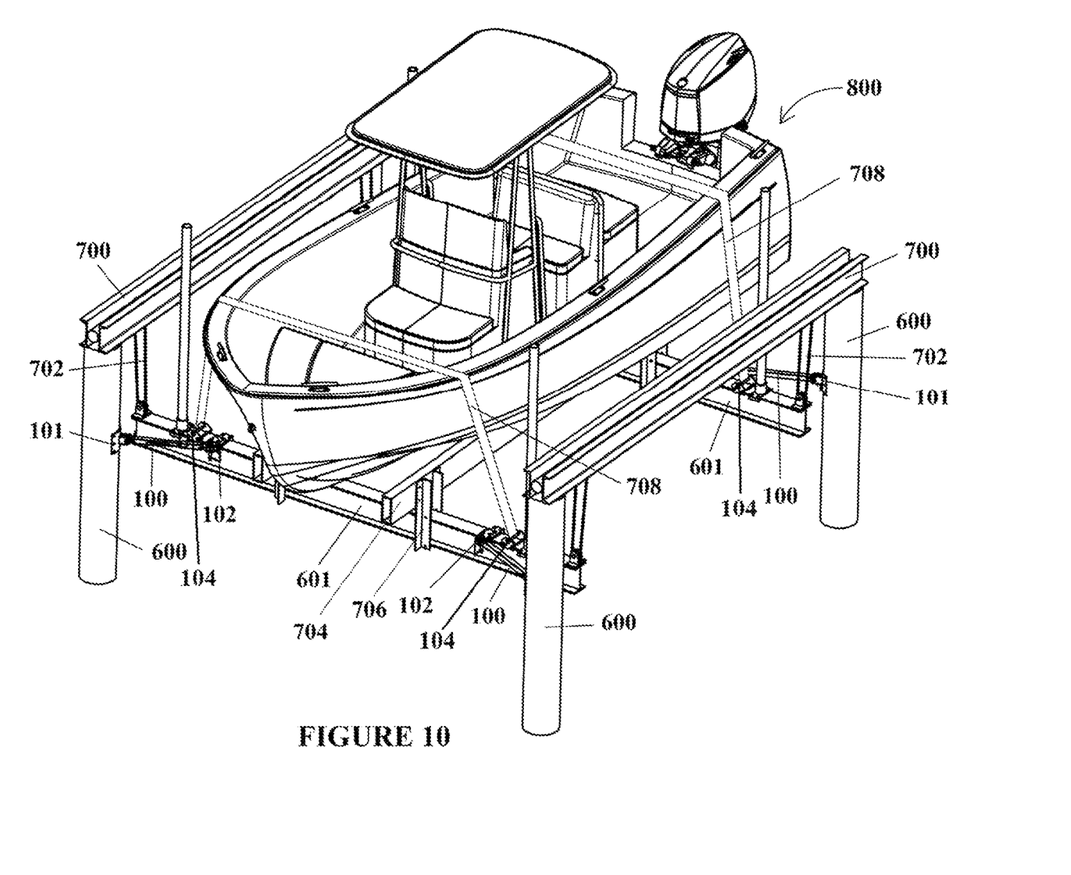
FIG. 10 illustrates a perspective view of the boat lift having the piling-mounted boat lift locking apparatus in an engaged position, and securing a boat therein, in accordance with the present invention.

FIG. 10 illustrates a perspective view of the boat lift having the piling-mounted boat lift locking apparatus in engaged position 508 and securing a boat therein. As shown, the boat 800 rests on and is supported by the bunk assembly 704 attached onto the lowering/raising platform 601 using bunk brackets 706. Further, as shown in the figure, a securing strap 708 is provided for securing boat 800 onto the lowering/raising platform 601, using strap attachment bracket assembly 104, thus providing extra support to the boat 800 and preventing any type of movements, specifically during a tidal surge.

In an embodiment of the present invention, the apparatus further discloses a mechanism of the setting of the turnbuckle 100, to facilitate the final attachment and removal of any possible movement between the turnbuckle 100 to the lift beam bracket assembly 102. The unlocking steps performed on the turnbuckle 100 include rotation of the adjustment handle 211 until perpendicular to the turnbuckle 100 main body and rotating the main body 200 with the adjustment handle 211 for setting the turnbuckle 100. By providing rotation using the adjustment handle 211, a change in length is achieved by means of a threaded coupling, a helical incline, which converts the rotary motion into a linear motion. When the main body of the turnbuckle 100 is rotated clockwise, the left-hand internal thread of the main body is mated with the left-hand external thread of the first end 420 rod, and the right-hand internal thread of the main body is mated with the external right-hand thread of the second end 421 rod and extend or increase the overall length, putting the device in compression. Further, stop pins on thread and stop pin on thread are provided, which are configured to prevent the turnbuckle 100 from disassembling when setting, and vice-versa, when the main body of the turnbuckle 100 is rotated counterclockwise 501, the left-hand internal thread of the main body mated with the left-hand external thread of the first end 420 rod, and the right-hand internal thread of the main body mated with the external right-hand thread of the second end 421 rod and retract or decrease the overall length, putting the turnbuckle 100 in tension. In an embodiment of the present invention both the left handed and right handed threads have a common pitch, making the same extension and retraction rates.

Upon reaching the desired length, the locking pin 260 is inserted into the concentric holes 373 of the attachment clevis 422 on the main lift beam bracket assembly 102 and through the through-hole 371 at the second end 421 of the turnbuckle 100, and the locking clip 261 is clasped around locking pin 260. According to the present invention, the Turnbuckle 100 does not require any additional adjustment after a successful setting.

For the turnbuckle 100 on the opposite side of the lift beam bracket assembly 102 of the common lowering/raising platform 601, after setting and pinning, the device can and should be further adjusted, preferably retracted putting the lift mechanism in tension, to remove any movement of the boat lift's lowering/raising platform 601 and strengthening this section of the boat lift. This phenomenon completes the linkage of the piling 600 to the boat lift lowering/raising platform 601 at this position. This same process is repeated for multiple locking/strengthening turnbuckles 100 used in the present apparatus. In accordance with another embodiment of the present invention, the turnbuckle 100 can be set and locked in any order as the order of setting is not critical to derive the benefit of the present invention.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there within.

Having thus described the invention in rather full detail, it will be understood that such detail need not be strictly adhered to, but that additional changes and modifications may suggest themselves to one skilled in the art, all falling within the scope of the invention as defined by the subjoined claims.

We claim:

1. A piling-mounted boat lift locking apparatus, comprising:
    a piling mounting bracket assembly (101) comprising a bracket plate (250) and a first clevis attachment point (255), wherein the piling mounting bracket assembly (101) is configured to attach to a piling (600);
    a turnbuckle (100) comprising a first end (420) and a second end (421), wherein the first end (420) of the turnbuckle (100) is pivoted in attachable engagement with the first clevis attachment point (255) of the piling mounting bracket assembly (101) to form a first connection point, and wherein the second end (421) of the turnbuckle (100) is configured to attach with a second clevis attachment point of a lowering/raising platform (601) to form a second connection point, said first and second connection points being substantially perpendicular to each other, said first connection point restricting side to side movement and said second connection point restricting up and down movement, whereby said first and second connection points operate collectively to restrict swaying movement of said boat lift and mitigate lateral and non-axial loads;
    a positioning indicator assembly (103) comprising a lift indicator (263) mounted into the clevis (255) of the piling mounting bracket assembly (101), and an activator bracket (264) mounted on the first end (420) of the turnbuckle (100), wherein when the turnbuckle (100) is deployed by manually rotating in a downward direction along the pivot point, the activator bracket (264) engages with the lift indicator (263) and forces the lift indicator (263) to raise from a normal resting position against a top surface of the clevis (255) of the piling mounting bracket assembly (101), thereby creating a visual gap indicating a safe and correct height of the lowering/raising platform (601) to an operator for attachment of the turnbuckle (100) with the lowering/raising platform (601).

2. The apparatus as claimed in claim 1, wherein the bracket plate (250) comprises a plurality of through holes, adapted to receive therein a plurality of fasteners (254) for securing the piling mounting bracket assembly (101) to the piling (600).

3. The apparatus as claimed in claim 1, wherein the turnbuckle (100) is pivoted to the first clevis attachment point (255) of the piling mounting bracket assembly (101) through a permanent locked screw (256), washers (256a), and lock nut (256b), which passes through a pivot hole (370) in the first end (420) of the turnbuckle (100).

4. The apparatus as claimed in claim 1, comprising a lift beam bracket assembly (102) mounted on the lowering/raising platform (601), wherein the lift beam bracket assembly (102) comprises a second clevis attachment point (422) configured to receive therein the second end (421) of the turnbuckle (100).

5. The apparatus as claimed in claim 1, wherein a locking pin (260) is provided for securing the second end (421) of the turnbuckle (100) inside the second clevis attachment point (422), the locking pin (260) comprising a shaft having a hole (374) therein, said hole being perpendicular to said shaft, and being adapted to accept a locking device.

6. The apparatus as claimed in claim 1, comprising a locking snap (262) attached onto the piling (600) at a distance from the piling mounting bracket assembly (101) for detachably snap-fitting the turnbuckle (100).

7. The apparatus as claimed in claim 1, comprising a strap attachment bracket assembly and a securing strap for connecting together the piling mounting bracket assembly (101) and lowering/raising platform (601).

8. The apparatus as claimed in claim 1, comprising a plurality of padlocks or pin locks for securing the apparatus to the piling to prevent theft.

9. The apparatus as claimed in claim 1, comprising a safety link that secures the lowering/raising platform (601) to the piling (600) in the event of partial failure of the lift components.

10. The apparatus as claimed in claim 1, said apparatus being configured to fit a standard commercially available piling-mounted boat lift.

11. The apparatus as claimed in claim 1, wherein said apparatus has an adjustment mechanism for eliminating swaying movement inherent in piling-mounted boat lifts.

12. The apparatus as claimed in claim 1, said apparatus having a locking mechanism associated with said adjustment mechanism so that upon being adjusted, said apparatus can be locked to remain in a rigid configuration.

13. The apparatus as claimed in claim 1, wherein said turnbuckles (100) are designed to handle increased non-axial loads.

14. The apparatus as claimed in claim 1, wherein said apparatus is hand deployed with no extra components or tools.

15. The apparatus as claimed in claim 1, wherein said apparatus is permanently mounted for rapid deployment.

16. The apparatus as claimed in claim 1, wherein said apparatus is operative to lock the piling-mounted boat lift for security and theft prevention.

* * * * *